United States Patent

[11] 3,589,739

| [72] | Inventor | Gerard Johan Scholten<br>Emmasingel, Eindhoven, Netherlands |
|---|---|---|
| [21] | Appl. No. | 854,960 |
| [22] | Filed | Sept. 3, 1969 |
| [45] | Patented | June 29, 1971 |
| [73] | Assignee | U.S. Philips Corporation<br>New York, N.Y. |
| [32] | Priority | Sept. 5, 1968 |
| [33] | | Netherlands |
| [31] | | 68/2699 |

[54] SEALING MEMBER
3 Claims, 5 Drawing Figs.

[52] U.S. Cl. .................................................. 277/96, 277/134
[51] Int. Cl. ...................................... F16j 15/34, F16j 15/54
[50] Field of Search ............................................. 277/134, 96

[56] References Cited
UNITED STATES PATENTS

| 2,188,857 | 1/1940 | Chieuitz ..................... | 277/134 X |
| 2,606,779 | 8/1952 | Jagger .......................... | 277/134 |
| 3,348,851 | 10/1967 | Symons et al. ................ | 277/134 |
| 3,501,155 | 3/1970 | Dega et al. .................... | 277/134 X |

FOREIGN PATENTS

| 307,710 | 1/1969 | Sweden ...................... | 277/134 |
| 499,480 | 1/1939 | Great Britain................ | 277/134 |
| 1,101,074 | 3/1961 | Germany...................... | 277/134 |

Primary Examiner—Samuel Rothberg
Attorney—Frank R. Trifari

ABSTRACT: A sealing member for a shaft passed through a structural component which sealing member consists of two comparatively rigid annular parts connected by a twistable ring between them. A plurality of regularly distributed very shallow grooves are provided in the sealing surface of the twistable ring, which grooves, in the case of a radial seal, extend axially and, in the case of an axial seal, extend radially. One of the comparatively rigid annular parts is constructed as a connection member and the other comparatively rigid part has some freedom of movement with respect to the connection member.

SEALING MEMBER

The invention relates to a sealing member for a shaft passed through a structural component, the shaft and the structural component being rotatable with respect to each other. The sealing member comprises a sealing surface which cooperates with a surface of the shaft or of the structural component, very shallow sealing grooves being provided in the sealing surface.

In known seals a pattern of helical grooves of shallow depth is provided in a cylindrical inner surface of a stationary bush. As a result of the oblique position of the shallow grooves (the pitch angle) the shaft, upon rotation, forms a hydrodynamically operating pump in cooperation with the grooves and a viscous medium (for example, a lubricant). The calculation of such a pump is known, for example, from the theory of the spiral groove bearings. This known device has the drawback of being suitable only for one direction of rotation of the shaft. If the shaft should rotate in the opposite direction, the viscous medium would be pumped out of the space in which it should remain enclosed.

Annular sealing members of rubber or a rubbery material, which are secured in a bush and a circumferential lug of which presses against the shaft are also known in the art. At drawback of these seals is that they can cause rather large frictional losses.

It is the object of the invention to provide a sealing member which is efficient, is independent of the direction of rotation of the shaft, and in which the frictional losses are low. In order to achieve this, the sealing member, according to the invention, consists of two comparatively rigid annular parts, the centers of which are situated on the center line of the sealing member, and a ring situated between the rigid annular parts. The ring is comparatively slack for torsion. The sealing surface of the ring, which is slack for torsion, has a number of regularly distributed very shallow grooves, the direction of which coincides with the line of intersection of the sealing surface and surfaces through the centerline of the sealing member. One of the comparatively rigid annular parts is constructed as a connection element of the sealing member and the other comparatively rigid annular part has some freedom of movement with respect to the connection element.

When, for example, the shaft rotates in a given direction the movable annular part will be apt to be taken along in the direction of rotation of the shaft as a result of the viscous friction in the medium which tends to leak to the outside through the seal. This has been made possible to a limited extent, by the ring which is comparatively slack for torsion. The movable annular part will experience an annular displacement of for example, a few degrees with respect to the connection rings. As a result of this, however, the grooves in the ring which is slack for torsion, will also assume an angle of, for example 5° to 10° with respect to their unloaded position. So a spiral groove seal is formed in which the viscous medium which tends to leak out of the seal is pumped back. Upon rotation of the shaft in the opposite direction, the movable annular parts will be taken along by the shaft in a direction opposite to that just mentioned. So the grooves in the sealing surface of the ring will again assume an angle with respect to their unloaded position and again in such a manner that the viscous medium which seeks to leak out of the seal is pumped back. The seal hence automatically adjusts so that no leakage can occur independent of the direction of rotation of the shaft.

In one embodiment according to the invention the sealing surface has a cylindrical shape and the sealing grooves extend parallel to the centerline of the sealing member.

In a further embodiment according to the invention the sealing surface has a flat shape and the sealing grooves are directed at right angles to the centerline of the sealing member.

In order that the invention may be readily carried into effect, a few examples thereof will now be described in greater detail, by way of example, with reference to the accompanying drawings, in which.

Figure 1:
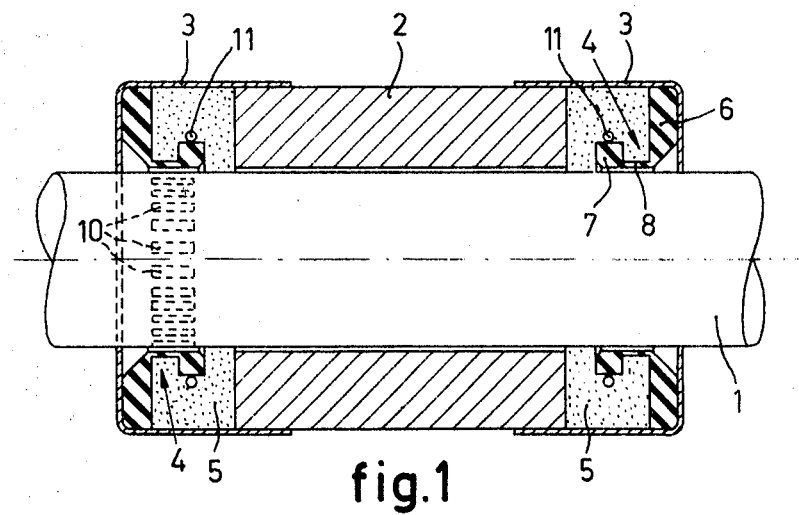
FIG. 1 shows a bearing construction with a continuous shaft in which a sealing member according to the invention is used at both ends of the bearing.

FIG. 1 shows a seal between a shaft 1 and a bearing bush 2. A cover 3 through which the shaft is passed is provided at either end of the bearing bush 2. A sealing member 4 is secured to each of the covers 3. The space 5 between the covers 3 and the bearing bush 2 is filled with a viscous medium, for example oil or grease, which serves for lubricating the bearing.

Figure 2:
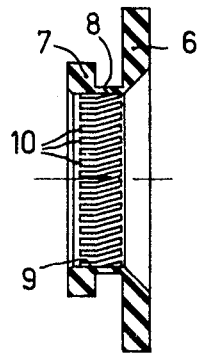
FIGS. 2 and 3 are cross-sectional views of an embodiment of the seal according to the invention.
Figure 3:
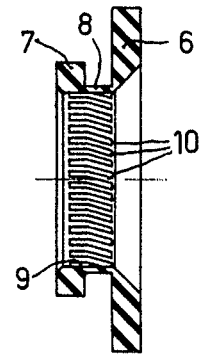

FIGS. 2 and 3 are cross-sectional views of the sealing member 4. It consists of a material having a modulus of elasticity which is low with respect to steel for example, rubber or a rubbery elastic substance. This sealing member comprises annular parts 6 and 7 and a ring 8. Because of their shape, the annular parts 6 and 7 are comparatively rigid, the ring 8 is comparatively thin and hence slack and easily twistable. The sealing surface 9 in this example has the same inside diameter for the three annular parts 6, 7 and 8. Very shallow grooves 10 are provided in the sealing surfaces 9 of the annular parts 7 and 8, the depth of said grooves being, for example, 10—25/$\mu$. In the unloaded condition of the sealing member 4, the grooves extend axially and are regularly distributed over the surface 9. Preferably the width of the grooves 10 is equal to the distance between adjacent grooves.

When the shaft shown in FIG. 1 rotates clockwise with respect to the bearing bush 2, as viewed from the right-hand end of the bearing in FIG. 1, the ring 7 will experience a rotational torque in the direction of rotation of the shaft, due to the friction produced in the viscous lubricant which tends to leak out of the bearing between the sealing member and the shaft. The annular part 7 will experience a small angular displacement with respect to the connection ring 6. This is made possible by the twistable ring 8. The originally axial sealing grooves 10 in the twistable ring 8 will become oriented at an angle with respect to the axial direction as is shown in FIG. 2. Together with the sealing surface, the grooves of which enclose an angle with the centerline of the shaft, the rotating shaft constitutes a viscous pump, which forces the lubricant that seeks to leak away back into the space 5. When the shaft is rotated in the opposite direction, the annular part 7 is also taken along, but this time in the opposite direction. The grooves in the twistable ring 8 will now make an angle with respect to the shaft as shown in FIG. 3. In this case also the viscous medium will be forced back into the space 5 as a result of the pumping effect. The effect of the sealing member according to the invention hence is that no viscous medium is lost independent of the direction of rotation of the shaft. It is to be noted that the sealing member 4 has to be incorporated in the correct manner in the sealing. It will be obvious that the pump constituted by the shaft 1 and the sealing member 4 will always produce a pumping effect in a direction extending from the twistable ring 8 towards the movable ring 7.

In the embodiment shown in FIGS. 1 to 3 the grooves are provided in the parts 7 and 8. It will be obvious that for the proper effect the grooves must be provided in the twistable ring 8. Preferably the grooves do not extend up to the outer side of the ring 7 and the ring 6. So in this case there are ungrooved surfaces which contribute to the fact that the lubricant will not leak away also when the shaft is stationary. If desirable a ring 11 may be arranged around the ring 7 (see FIG. 1) so as to obtain very good seals during the stationary position.

Figure 4:
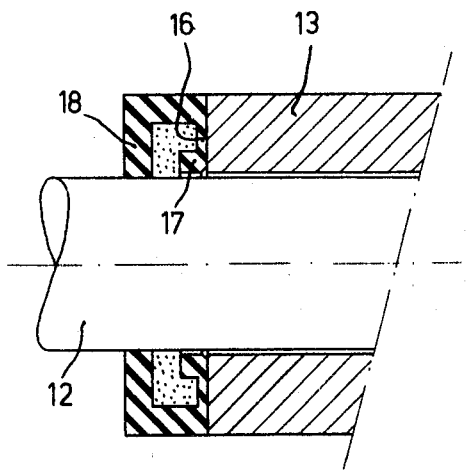
FIGS. 4 and 5 are a cross-sectional view and an elevation, respectively, of a further embodiment of the sealing member.
Figure 5:
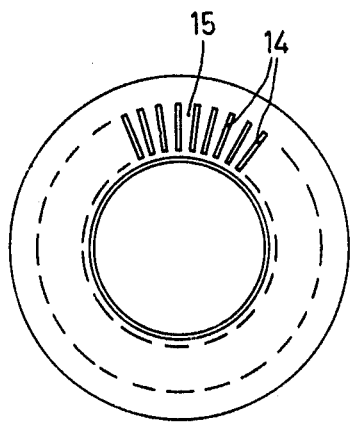

FIGS. 4 and 5 show a sealing member which is suitable for forming a seal between a flat surface of, for example, a bearing bush 13 and a shaft 12. The sealing member comprises a flat sealing surface 15 provided with grooves 14, which grooves are situated at least in the twistable annular part 16. The movable annular part is denoted by 17, the connection ring 18 is secured to the shaft. In principle the operation of this seal is similar to that of the bearing described with reference to FIGS. 1 to 3. Upon rotation of the shaft 12 or the bush 13 the ring 17 will experience a small angular displacement with respect to the ring 18. The grooves 14 in the twistable annular part 16 enclose an angle with the direction which they assumed in the unloaded condition. The relatively movable flat surfaces of bearing bush 13 and sealing member form a viscous pump as a result of the grooves which are arranged at an angle, which pump forces the lubricant which wants to leak away in the direction of the centerline of the shaft 12. As shown in FIG. 5, the grooves 14 in this embodiment extend radially when viewed in the unloaded conditions.

What I claim is:

1. A sealing member for creating a seal between a shaft rotatably mounted in a structural component and said structural component, the sealing member comprising a first rigid annular part, a second rigid annular part connected with said first annular part, said first and second annular parts being concentric with the longitudinal axis of the sealing member, a ring of relatively flexible material between said first and second annular parts for connecting said parts together, the surface of said ring being a sealing surface for cooperation with the surface of one of the elements between which the seal is being established, a plurality of evenly spaced shallow grooves located on said sealing surface, the direction of the grooves being coincident with the plane of the sealing surface, said first rigid annular part functioning as a connection for the sealing member and said second annular part having relative freedom of movement with respect to the first annular part.

2. A sealing member for creating a seal between a shaft rotatably mounted in a structural component and said structural component, the sealing member comprising a first rigid annular part for connection to the sealing member, a second rigid annular part connected with said first annular part and being relatively free for movement with said shaft, said first and second annular parts being concentric with the longitudinal axis of the sealing member, a ring of relatively flexible material between said first and second annular parts for connecting said parts together, the surface of said ring being a sealing surface of cylindrical shape for cooperation with the surface of said shaft, a plurality of evenly spaced shallow grooves located on said sealing surface, the direction of the grooves being parallel to said longitudinal axis of said sealing member.

3. A sealing member for creating a seal between a shaft rotatably mounted in a structural component and said structural component, the sealing member comprising a first rigid annular part, a second rigid annular part connected with said first annular part, said first and second annular parts being concentric with the longitudinal axis of the sealing member, a ring of relatively flexible material between said first and second annular parts for connecting said parts together, the surface of said ring being a sealing surface for cooperation with the surface of said structural component, a plurality of evenly spaced shallow grooves located on said sealing surface, the direction of the grooves being oriented at 90° with respect to said longitudinal axis of said sealing member, said first rigid annular part functioning as a connection for the sealing member and said second annular part having relative freedom of movement with respect to the first annular part.